United States Patent
Sun et al.

(10) Patent No.: US 12,302,147 B2
(45) Date of Patent: May 13, 2025

(54) METHOD FOR BEAM RECOVERY AND DEVICE

(71) Applicant: VIVO MOBILE COMMUNICATION CO.,LTD., Guangdong (CN)

(72) Inventors: Peng Sun, Chang'an Dongguan (CN); Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 524 days.

(21) Appl. No.: 17/515,200

(22) Filed: Oct. 29, 2021

(65) Prior Publication Data

US 2022/0053360 A1 Feb. 17, 2022

Related U.S. Application Data

(63) Continuation of application No. PCT/CN2020/087405, filed on Apr. 28, 2020.

(30) Foreign Application Priority Data

Apr. 30, 2019 (CN) .......................... 201910363217.1

(51) Int. Cl.
*H04W 24/10* (2009.01)
*H04W 24/04* (2009.01)
*H04W 72/044* (2023.01)

(52) U.S. Cl.
CPC ........... *H04W 24/10* (2013.01); *H04W 24/04* (2013.01); *H04W 72/046* (2013.01)

(58) Field of Classification Search
CPC ... H04W 24/10; H04W 24/04; H04W 72/046; H04W 24/02; H04W 72/23; H04W 72/12; H04W 72/02; H04W 72/21; H04B 7/0695

USPC ........................................................ 370/329
See application file for complete search history.

(56) References Cited

U.S. PATENT DOCUMENTS

| | | | |
|---|---|---|---|
| 2018/0227899 A1 | 8/2018 | Yu et al. | |
| 2018/0278310 A1 | 9/2018 | Lee et al. | |
| 2019/0124640 A1* | 4/2019 | Nagaraja | H04B 7/0695 |
| 2019/0253986 A1* | 8/2019 | Jeon | H04L 5/0048 |
| 2020/0052770 A1* | 2/2020 | Chen | H04B 7/088 |
| 2020/0083946 A1 | 3/2020 | You et al. | |
| 2020/0145169 A1* | 5/2020 | Zhou | H04L 1/1896 |
| 2020/0228183 A1* | 7/2020 | Venugopal | H04B 7/063 |

(Continued)

FOREIGN PATENT DOCUMENTS

| | | | |
|---|---|---|---|
| CN | 108093481 A | 5/2018 | |
| CN | 108111286 A | 6/2018 | |

(Continued)

OTHER PUBLICATIONS

European Search Report dated May 23, 2022 as received in application No. 20798382.6.

(Continued)

*Primary Examiner* — Jutai Kao
*Assistant Examiner* — Syed M Bokhari
(74) *Attorney, Agent, or Firm* — BROOKS KUSHMAN P.C.

(57) ABSTRACT

A method for beam recovery and a device are provided. The method includes: receiving resource(s) configured by a network side; and reporting information associated with beam recovery by using the resource(s) configured by the network side.

15 Claims, 4 Drawing Sheets

(56) References Cited

U.S. PATENT DOCUMENTS

| | | | |
|---|---|---|---|
| 2020/0245372 A1* | 7/2020 | Lei | H04W 74/0833 |
| 2020/0304218 A1 | 9/2020 | Gao et al. | |
| 2020/0367308 A1 | 11/2020 | Chen et al. | |
| 2021/0344404 A1* | 11/2021 | Matsumura | H04W 76/19 |

FOREIGN PATENT DOCUMENTS

| | | |
|---|---|---|
| CN | 108260212 A | 7/2018 |
| CN | 108631845 A | 10/2018 |
| CN | 108924929 A | 11/2018 |
| CN | 109246743 A | 1/2019 |
| WO | 2019032882 A1 | 2/2019 |

OTHER PUBLICATIONS

Huawei, "Enhancements on multi-beam operation" 3GPP TSG RAN WG1 Meeting #96bis, R1-1903971, Apr. 8, 2019.
Chinese Office Action dated Nov. 25, 2021 as received in application No. 201910363217.1.
"Link Recovery Procedure for Beam Failure" 3GPP TSG RAN WG1 Meeting #88b R1-1704230. Apr. 3, 2017. Huawei.
"RAN2 Aspects of DL Beam Management" 3GPP TSG-RAN WG2#99bis R2-1710562, Oct. 9, 2017. Huawei.
International Search report and Written Opinion dated Nov. 11, 2021 as received in application No. PCT/CN2020/087405.
Intel Corporation, Summary 2 on SCell BFR and L1-SINR, R1-1905821, 3GPP TSG RAN WG1 Meeting #96b, Xi'an, China, Apr. 8-12, 2019.
Korean Office Action issued in corresponding application No. 10-2021-7037819, dated Jul. 25, 2023.

\* cited by examiner

METHOD FOR BEAM RECOVERY AND DEVICE

CROSS-REFERENCE TO RELATED APPLICATIONS

This application is continuation application of PCT International Application No. PCT/CN2020/087405 filed on Apr. 28, 2020, which claims priority to Chinese Patent Application No. 201910363217.1, filed in China on Apr. 30, 2019, the disclosures of which are incorporated in their entireties by reference.

TECHNICAL FIELD

Embodiments of this disclosure relate to the field of communication technologies, and specifically, to a method for beam recovery and a device.

BACKGROUND

A terminal measures a beam failure detection reference signal at a physical layer, and determines, based on a measurement result, whether a beam failure event has occurred. After determining that a beam failure event has occurred, the terminal reports a required transmission resource (that is, a dedicated reporting resource) through a media access control control element (MAC CE), and after receiving a dedicated reporting resource configured by a network side, performs beam recovery reporting by using the dedicated reporting resource.

The dedicated reporting resource requires an additional request procedure, as a result of which the manner for beam recovery reporting in the related art is subject to a relatively large delay and excessive resource overheads.

SUMMARY

One objective of embodiments of this disclosure is to provide a method for beam recovery and a device.

According to a first aspect, an embodiment of this disclosure provides a method for beam recovery, applied to a terminal and including:
receiving resource(s) configured by a network side; and
reporting information associated with beam recovery by using the resource(s) configured by the network side.

According to a second aspect, an embodiment of this disclosure further provides a method for beam recovery, applied to a network device and including:
transmitting resource(s) configured by a network side to a terminal, where the resource(s) configured by the network side are used for the terminal to report information associated with beam recovery.

According to a third aspect, an embodiment of this disclosure further provides a terminal, including:
a receiving module, configured to receive resource(s) configured by a network side; and
a first transmitting module, configured to report information associated with beam recovery by using the resource(s) configured by the network side.

According to a fourth aspect, an embodiment of this disclosure further provides a network device, including:
a second transmitting module, configured to transmit resource(s) configured by a network side to a terminal, where the resource(s) configured by the network side are used for the terminal to report information associated with beam recovery.

According to a fifth aspect, an embodiment of this disclosure further provides a communications device, including a processor, a memory, and a program stored in the memory and capable of running on the processor, where when the program is executed by the processor, the steps of the method for beam recovery according to the first aspect or the second aspect are implemented.

According to a sixth aspect, an embodiment of this disclosure further provides a computer-readable storage medium, where the computer-readable storage medium stores a computer program, and when the computer program is executed by a processor, the steps of the method for beam recovery according to the first aspect or the second aspect are implemented.

BRIEF DESCRIPTION OF DRAWINGS

Those of ordinary skill in the art will be clear about other advantages and benefits by reading detailed description of the optional embodiments below. The accompanying drawings are merely intended to illustrate the purposes of the optional embodiments, and should not be construed as a limitation on this disclosure. Throughout the accompanying drawings, the same reference numerals represent the same components. In the accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are merely some rather than all of the embodiments of this disclosure. All other embodiments obtained by persons of ordinary skill in the art based on the embodiments of this disclosure shall fall within the protection scope of this disclosure.

In the specification and claims of this application, the term "include" and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: only A, only B, or both A and B.

In the embodiments of this disclosure, terms such as "an example" or "for example" are used to represent examples, illustrations, or explanations. Any embodiment or design solution described as "an example" or "for example" in the embodiments of this disclosure shall not be interpreted as being more preferred or advantageous than other embodiments or design solutions. Specifically, the terms such as "an example" or "for example" are used to present related concepts in a specific manner.

For better understanding the technical solutions in the embodiments of this disclosure, the following first describes several technical points.

1. Beam Failure Recovery (Beam Failure Recovery) Mechanism

In a high band communications system, because a wavelength of a radio signal is short, the signal is prone to blocking in propagation and the like, resulting in interruption of signal propagation. In a case that the radio link reconstruction in the related art is adopted, it takes a long time, so a beam failure recovery mechanism is introduced. The mechanism includes the following four parts:

(1) Beam failure detection (BFD): A terminal measures a beam failure detection reference signal at a physical layer, and determines, based on a measurement result, whether a beam failure event occurs. The determination criterion is: if it is detected that metrics (hypothetical physical downlink control channel block error ratio (hypothetical PDCCH BLER)) of all serving beams meet a preset condition (for example, exceeding a preset threshold), a beam failure instance is determined; and the physical layer of the terminal reports an indication to a higher layer (media access control (MAC) layer) of the terminal, where the reporting process is periodic. On the contrary, if the physical layer of the terminal determines that no beam failure instance has occurred, it transmits no indication to the higher layer. The higher layer of the terminal uses a counter to count the indications reported by the physical layer, and the terminal declares occurrence of a beam failure event when the network-configured maximum number is reached.

(2) New candidate beam identification: The physical layer of the terminal measures a beam identification reference signal (beam identification RS) to find a new candidate beam.

This step is not enforced to be performed after a beam failure event occurs, and may be performed before a beam failure event. When receiving a request or an indication or a notification from the higher layer (MAC layer) of the terminal, the physical layer of the terminal reports to the higher layer of the terminal a measurement result that meets a preset condition (quality measured on a beam identification RS exceeds a preset L1-reference signal received power (Layer 1 Reference Signal Received Power, L1-RSRP) threshold). The reported content is {beam RS index, L1-RSRP}. The higher layer of the terminal selects a candidate beam based on the report of the physical layer.

(3) Beam failure recovery request transmission: The higher layer (MAC layer) of the terminal determines a physical random access channel sequence or sequence (PRACH resource/sequence) based on the selected candidate beam. If the terminal determines that a trigger condition of a beam failure recovery request (BFRQ) is met, the terminal transmits the above request (request) to a base station on a contention-free physical random access channel (PRACH). The terminal is required to transmit the request according to a network-configured number of request transmission times and/or timer (timer). Here the contention-free PRACH resource and other PRACH resources (for example, a PRACH resource for initial access) may be frequency division multiplexing (FDM) or code division multiplexing (CDM) resources, where CDM-based PRACH preambles (preambles) are required to have a same sequence design.

(4) The UE monitors a gNB response for beam failure recovery request (UE monitors gNB response for beam failure recovery request): After receiving the beam failure recovery request, the base station transmits a response (response) in a dedicated (dedicated) physical downlink control channel (PDCCH) for control resource set-beam failure recovery (CORESET-BFR). The response carries a cell radio network temporary identifier (C-RNTI), and also possibly includes an indication to switch to a new candidate beam or restart beam search or other indications. If the beam failure recovery is unsuccessful, the physical layer of the terminal transmits an indication to the higher layer of the terminal for the higher layer to determine a subsequent radio link failure process.

It should be noted that the beam herein may also be referred to as a spatial filter (spatial filter), a spatial domain transmission filter (spatial domain transmission filter), or the like. The beam information may also be named otherwise, for example, transmission configuration indicator (TCI) state (state) information, quasi co-location (QCL) information, spatial relation (spatial relation) information, or the like.

2. Secondary Cell (SCell) Beam Failure Recovery Mechanism

For a multi-carrier scenario (which may be understood as carrier aggregation (CA), where there are a plurality of carriers (carrier) or a plurality of component carriers (CC) or a plurality of cells (cell)), there is one primary cell (for example, a primary cell (PCell) in a master cell group (MCG), or a primary secondary cell (PSCell) and at least one Scell in a secondary cell group (SCG)). The conclusions in related technologies are as follows:

(1) Scenarios:
  a. S cell with downlink and uplink;
  b. SCell with downlink only (SCell with DL only); and
  c. Pcell in FR1 or FR2, where FR stands for frequency range (frequency range).

(2) Secondary cell beam failure detection reference signal (SCell BFD RS):
  a. periodic 1-port channel state information reference signal (1-port CSI-RS);
  b. measurement result based on hypothetical block error rate (hypothetical BLER); and
  c. at least for an explicit configuration, a downlink reference signal for beam failure detection (DL RS for BFD) being located in a current component carrier (current CC).

(3) BFRQ:
  a. transmission condition: if the terminal declares beam failure (UE declares beam failure), the terminal transmits a BFRQ to a network;
  b. if a new candidate beam reference signal (new candidate beam RS) and a corresponding threshold (threshold) are configured, and at least channel quality of a new beam (new beam) is greater than or equal to the threshold, the terminal reports new beam information during beam failure recovery (BFR);
  c. a downlink reference signal for new beam identification (DL RS for new beam identification) may be based on a synchronization signal and PBCH block (Synchronization Signal and PBCH block, SSB) and a channel state information reference signal for beam management (CSI-RS for beam management, CSI-RS for BM);
  d. a downlink reference signal for new beam identification (DL RS for new beam identification) may be transmitted on an active bandwidth part (active BWP), where the BWP belongs to a CC configured for BFR monitoring or another CC in a same band (band);

e. new beam identification threshold (New beam identification threshold) is based on L1-RSRP; and f. for S cell with downlink only, the terminal reports failed component carrier index (es) (failed CC index(es)) and reports new beam information (if present) by using a physical uplink shared channel or physical uplink control channel (new beam information (if present) by PUSCH or PUCCH).

The technologies described herein are not limited to 5th generation (5th-generation, 5G) systems, subsequent evolution communications systems, and LTE/LTE advanced (LTE-Advanced, LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are usually used interchangeably. The CDMA system may implement radio technologies such as CDMA2000 and universal terrestrial radio access (UTRA). UTRA includes wideband CDMA (WCDMA) and other CDMA variants. The TDMA system can implement radio technologies such as the global system for mobile communications (GSM). The OFDMA system may implement radio technologies such as ultra mobile broadband (UMB), evolved UTRA (Evolved-UTRA, E-UTRA), IEEE 802.11 (wireless fidelity (wireless fidelity, Wi-Fi)), IEEE 802.16 (worldwide interoperability for microwave access (Worldwide Interoperability for Microwave Access, WiMAX)), IEEE 802.20, and Flash-OFDM. UTRA and E-UTRA are both part of the universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described in this specification may be used for the foregoing systems and radio technologies, and may also be used for other systems and radio technologies.

Figure 1:
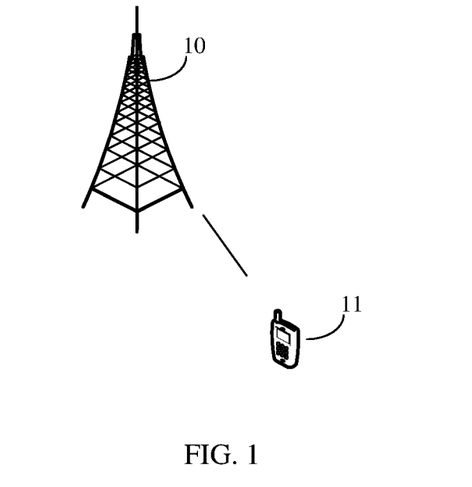
FIG. 1 is a schematic architectural diagram of a wireless communications system according to an embodiment of this disclosure.

The following describes the embodiments of this disclosure with reference to the accompanying drawings. A method for beam recovery and a device that are provided in the embodiments of this disclosure may be applied to a wireless communications system. FIG. 1 is a schematic architectural diagram of a wireless communications system according to an embodiment of this disclosure. As shown in FIG. 1, the wireless communications system may include a network device 10 and a terminal 11. The terminal 11 may be denoted as UE 11. The terminal 11 may perform communication (signaling transmission or data transmission) with the network device 10. In practical applications, a connection between the above devices may be a wireless connection. For ease of visually representing the connection relationship between the devices, a solid line is used in FIG. 1.

The network device 10 provided in this embodiment of this disclosure may be a base station. The base station may be a commonly used base station or an evolved node base station (evolved Node Base Station, eNB), or may be a network device in a 5G system (for example, a next generation node base station (gNB)), a transmission and reception point (TRP), or another device.

The terminal 11 provided in this embodiment of this disclosure may be a mobile phone, a tablet computer, a notebook computer, an ultra-mobile personal computer (UMPC), a netbook, a personal digital assistant (PDA), a mobile Internet device (MID), a wearable device, a vehicle-mounted device, or the like.

Figure 2:
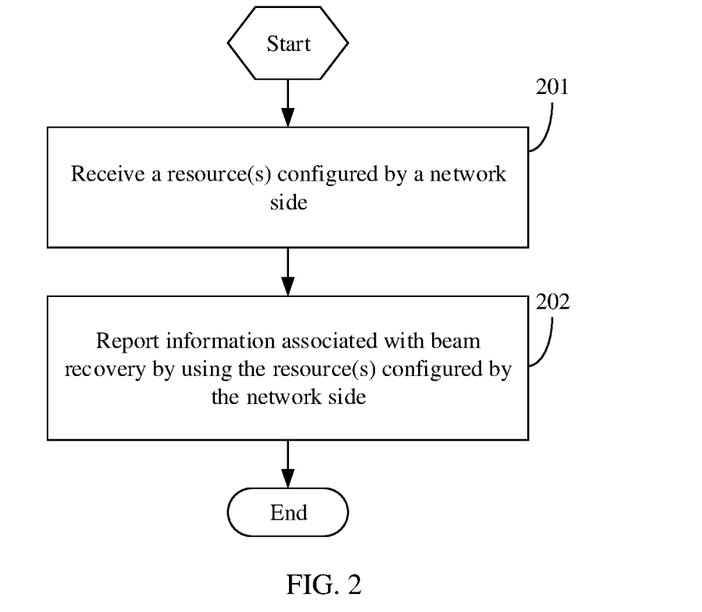
FIG. 2 is a first flowchart of a method for beam recovery according to an embodiment of this disclosure.

Referring to FIG. 2, an embodiment of this disclosure provides a method for beam recovery. The method is performed by a terminal. Specific steps include step 201 and step 202.

Step 201: Receive resource(s) configured by a network side.

It should be noted that the resource(s) configured by the network side is not a dedicated resource requested by the terminal for reporting information associated with beam recovery. That is, in a case that the terminal does not request the network side for a dedicated resource for reporting information associated with beam recovery, the terminal may implement a beam recovery reporting procedure based on the configured resource received from the network side. In this way, a delay in beam recovery reporting can be effectively reduced, and because the resource can also be used for other processing procedures, system overhead can be effectively reduced.

Step 202: Report information associated with beam recovery by using the resource(s) configured by the network side.

In this embodiment of this disclosure, optionally, the information associated with beam recovery may include one or more of the following: (1) user information; (2) cell information, such as a cell index; (3) beam failure event information; (4) candidate beam information, such as information about a candidate beam with highest signal quality, and information about a candidate beam with second highest signal quality; and (5) beam measurement result information.

In this embodiment of this disclosure, optionally, in step 202, one or more reporting resources are selected from the resource(s) configured by the network side; and the information associated with beam recovery is reported by using the one or more reporting resources.

In this embodiment of this disclosure, optionally, the selecting one or more reporting resources from the resource(s) configured by the network side may include one or more of the following: (1) selecting one or more specified types of resources from the resource(s) configured by the network side; (2) selecting a specified resource from one or more types of resources configured by the network side; and (3) selecting one or more types of resources from some types of resources configured by the network side.

In this embodiment of this disclosure, optionally, the selecting one or more specified types of resources includes selecting one or more types of resources from multiple types of resources according to a predetermined rule, where the predetermined rule includes any one of the following.

(1) Selecting a resource that appears earliest.

For example, if a first type of resource has a cycle of 4 ms, the resource appears at the first millisecond, the fifth millisecond, or the ninth millisecond. If a second type of resource has a cycle of 5 ms, the resource appears at the second millisecond, the seventh millisecond, or the twelfth millisecond.

If a beam failure occurs at the sixth millisecond, and the predetermined rule is to use a resource that appears earliest after 2 ms, a first type of resource at the ninth millisecond needs to be selected for reporting.

(2) Selecting a resource that appears after a preset time.

It should be noted that the preset time is not limited in this embodiment of this disclosure.

(3) Selecting a resource that appears earliest after a preset time.

(4) Selecting a second type of resource if a first type of resource is not configured, where the first type and the second type are two different resource types.

If no contention-free 2-step random access channel resource is configured, a contention-based 2-step random access channel resource is selected. Certainly, it can be understood that the first type and the second type are not specifically limited in this embodiment of this disclosure.

In this embodiment of this disclosure, optionally, the specified resource includes a resource that appears earliest after a preset time among one or more types of resources configured by the network side.

In this embodiment of this disclosure, optionally, the some types of resources may include at least two of the following: dynamic grant (dynamic grant) resource, configured grant (configured grant) resource, and contention-based 2-step random access channel resource, and certainly, are not limited thereto.

In this embodiment of this disclosure, optionally, in step 202, the information associated with beam recovery is reported by using a contention-based PRACH resource; a contention-free PRACH resource; a type-1 or type-2 configured grant physical uplink shared channel PUSCH resource; a dynamically scheduled PUSCH resource; a PUSCH resource dedicated to beam failure recovery; a contention-based 2-step random access channel resource; a contention-free 2-step random access channel resource; a 2-step random access channel resource dedicated to beam failure recovery; a physical uplink control channel PUCCH resource; or a PUCCH resource dedicated to beam failure reporting.

In this embodiment of this disclosure, optionally, in step 202, part or all of the information associated with beam recovery is selected; and the part or all of the information is reported by using the resource(s) configured by the network side.

In this embodiment of this disclosure, optionally, the selecting part or all of the information associated with beam recovery may include one or more of the following:

(1) selecting part or all of the information associated with beam recovery based on a priority of to-be-reported information, where, for example, a priority of user information is higher than a priority of beam failure event information;

(2) selecting part or all of the information associated with beam recovery based on a cell priority, where, for example, a priority of cell 1 is higher than a priority of cell 2, and for example, a priority of a cell 1 index (index) is higher than a priority of a cell 2 index;

(3) selecting part or all of the information associated with beam recovery based on a priority beam measurement result, where, for example, a priority of information about candidate beam with the highest signal quality of cell 1 is higher than a priority of information about candidate beam with the highest signal quality of cell 2; and (4) selecting part or all of the information associated with beam recovery based on a transport block size (TBsize), where, for example, reporting in the order agreed in (1), (2), and/or (3) is performed until a pre-agreed TBsize is reached.

For example, the information is reported in the following order: user information>beam failure event information>cell 1 index>cell 2 index information about a candidate beam with the highest signal quality of cell 1 information about a candidate beam with the highest signal quality of cell 2 information about a candidate beam with second highest signal quality of cell 1 information about a candidate beam with second highest signal quality of cell 2.

In this embodiment of this disclosure, optionally, the resource(s) configured by the network side may include one or more of the following.

(1) A contention-based PRACH (Contention-based PRACH) resource.

(2) A contention-free PRACH (Contention-free PRACH) resource.

For example, this type of resource may include a contention-free PRACH resource dedicated to beam failure.

(3) A type-1 or type-2 configured grant (Type 1/2 Configured grant) physical uplink shared channel (PUSCH) resource.

(4) A dynamically scheduled PUSCH resource.

(5) A PUSCH resource dedicated to beam failure recovery.

For example, this type of resource may be configured in the following mode: In a beam failure recovery procedure configured for a cell, a PUSCH resource corresponding to the procedure and a cell to which the resource belongs are clearly indicated.

(6) A contention-based 2-step random access channel (Contention-based 2 step RACH) resource.

For example, this type of resource may be configured in a broadcast manner and shared with other users.

(7) A contention-free 2-step random access channel (Contention-free 2 step RACH) resource.

For example, this type of resource may be configured in a broadcast or UE-specific (UE-specific) manner.

For another example, a use purpose of this type of resource may not be limited during configuration.

(8) A 2-step random access channel resource dedicated to beam failure recovery.

For example, this type of resource is configured in the following mode: In a beam failure recovery procedure configured for a cell (cell), PRACH and PUSCH resources corresponding to the procedure and cells to which these resources belong are clearly indicated.

(8) A physical uplink control channel (PUCCH) resource.

(9) A PUCCH resource dedicated to beam failure reporting.

For example, this type of resource is configured in the following mode: In a beam failure recovery procedure configured for a cell, a PUCCH resource corresponding to the procedure and a cell to which the resource belongs are clearly indicated.

In this embodiment of this disclosure, optionally, step 201 may include one or more of the following manners:

(1) obtaining a PUSCH resource corresponding to a beam failure recovery procedure and/or a cell to which the PUSCH resource corresponding to the beam failure recovery procedure belongs, where the PUSCH resource and/or the cell is indicated by the network side when the network side is configuring the beam failure recovery procedure;

(2) obtaining a contention-based 2-step random access channel resource configured by the network side in a broadcast or UE-specific manner;

(3) obtaining a contention-free 2-step random access channel resource configured by the network side in a broadcast or UE-specific (UE-specific) manner;

(4) obtaining a PRACH resource corresponding to a beam failure recovery procedure and/or a cell to which the PRACH resource corresponding to the beam failure recovery procedure belongs, where the PRACH resource and/or the cell is indicated by the network device when the network side is configuring the beam failure recovery procedure; and (5) obtaining a PUCCH resource corresponding to a beam failure recovery procedure and/or a cell to which the PUCCH resource corresponding to the beam failure recovery procedure belongs, where the PUCCH resource and/or the cell is indicated by the network device when the network side is configuring the beam failure recovery procedure.

In this embodiment of this disclosure, the terminal may report the information associated with beam recovery by using the resource(s) configured by the network side. This can avoid a problem that a large delay and excessive resource overheads are caused in terminal reporting when the terminal requests for a dedicated reporting resource, thereby effectively reducing the reporting delay. The resource(s) configured by the network side is not a dedicated reporting resource, and therefore system overheads can be effectively reduced.

Further, in the related art, content carried by reported information is limited, and a cell index, beam information, and the like cannot be effectively reported in a PRACH. However, in this embodiment of this disclosure, to-be-reported content may be selected according to a reported information selection rule, thereby avoiding a problem that some important information cannot be reported.

Figure 3:
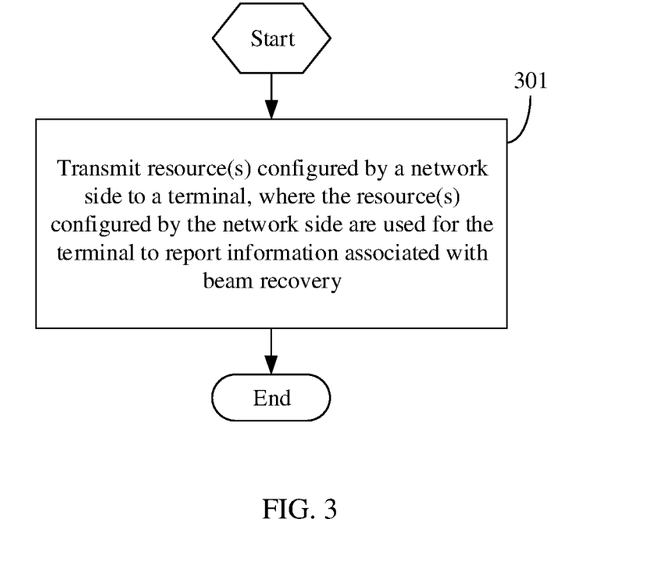
FIG. 3 is a second flowchart of a method for beam recovery according to an embodiment of this disclosure.

Referring to FIG. 3, an embodiment of this disclosure provides a method for beam recovery. The method is performed by a terminal and includes, specifically, step 301.

Step 301: Transmit resource(s) configured by a network side to a terminal, where the resource(s) configured by the network side are used for the terminal to report information associated with beam recovery.

In this embodiment of this disclosure, optionally, the resource(s) configured by the network side may include one or more of the following.

(1) A contention-based PRACH (Contention based PRACH) resource.

(2) A contention-free PRACH (Contention free PRACH) resource.

For example, this type of resource may include a contention-free PRACH resource dedicated to beam failure.

(3) A type-1 or type-2 configured grant (Type1/2 Configured grant) physical uplink shared channel (Physical Uplink Shared Channel, PUSCH) resource.

(3) A dynamically scheduled PUSCH resource.

(4) A PUSCH resource dedicated to beam failure recovery.

For example, this type of resource may be configured in the following mode: In a beam failure recovery procedure configured for a cell, a PUSCH resource corresponding to the procedure and a cell to which the resource belongs are clearly indicated.

(5) A contention-based 2-step random access channel (Contention-based 2 step RACH) resource.

For example, this type of resource may be configured in a broadcast manner and shared with other users.

(6) A contention-free 2-step random access channel (Contention-free 2 step RACH) resource.

For example, this type of resource may be configured in a broadcast or UE-specific (UE-specific) manner.

For another example, a use purpose of this type of resource may not be limited during configuration.

(7) A 2-step random access channel resource dedicated to beam failure recovery.

For example, this type of resource is configured in the following mode: in configuring a beam failure recovery procedure for a cell (cell), PRACH and PUSCH resources corresponding to the procedure and cells to which these resources belong are clearly indicated.

(8) A physical uplink control channel (PUCCH) resource.

(9) A PUCCH resource dedicated to beam failure reporting.

For example, this type of resource is configured in the following mode: In a beam failure recovery procedure configured for a cell, a PUCCH resource corresponding to the procedure and a cell to which the resource belongs are clearly indicated.

In this embodiment of this disclosure, optionally, step 301 includes one or more of the following:

(1) when configuring a beam failure recovery procedure, indicating, to the terminal, a PUSCH resource corresponding to the beam failure recovery procedure and/or a cell to which the PUSCH by the network side when the network side;

(2) transmitting, to the terminal in a broadcast manner, a contention-based 2-step random access channel resource configured by the network side;

(3) transmitting, to the terminal in a broadcast or UE-specific manner, a contention-free 2-step random access channel resource configured by the network side;

(4) when configuring a beam failure recovery procedure, indicating, to the terminal, a PRACH resource corresponding to the beam failure recovery procedure and/or a cell to which the PRACH by the network side when the network side; and (5) when configuring a beam failure recovery procedure, indicating, to the terminal, a PUCCH resource corresponding to the beam failure recovery procedure and/or a cell to which the PUCCH resource corresponding to the beam failure recovery procedure belongs.

In this embodiment of this disclosure, optionally, the information associated with beam recovery may include one or more of the following: (1) user information; (2) cell information; (3) beam failure event information; (4) candidate beam information; and (5) beam measurement result information.

In this embodiment of this disclosure, the network side may configure the resource for the terminal to report the information associated with beam recovery. This can avoid a problem that a large delay is caused in terminal reporting because the network side transmits a resource to the terminal only after receiving a request for dedicated reporting resource, thereby effectively reducing the reporting delay.

Further, the resource(s) configured by the network side is not a dedicated reporting resource, and therefore system overheads can be effectively reduced.

The following describes the procedure of this embodiment of this disclosure with reference to step 1 to step 3.

Step 1: UE receives resource(s) configured by a network side.

Step 2: After detecting a beam failure in a cell, the UE selects, in a pre-agreed manner, one or more of the resource(s) configured by the network side, to report information about beam failure, cell index (cell index), candidate beam, beam quality, and the like.

(a) The pre-agreement may include i to iv, with details as follows:
  i. agreement on how one type of resource is selected from multiple types of resources:
     for example, using a type of resource that appears earliest among multiple types of resources;
     for example, using a type of resource that appears after a specified time requirement is met; and for example, using a type of resource that appears earliest after a period of time among multiple types of resources;

ii. agreement on which resource is to be selected from one type of resource:

for example, using a resource that appears earliest after a period of time among a given type of resource;

iii. agreement on which one or more of several manners are used:

for example, selection from only dynamic grant, configured grant, and contention-free 2-step RACH resources even if more configured resources are received; and iv. agreement on a resource selection manner, for example, selecting a contention-based 2-step RACH resource if there is no contention-free 2-step RACH resource.

Step 3: If a contention-based 2-step RACH resource or contention-free 2-step RACH resource or a dedicated 2-step RACH resource configured for BFR is selected, the UE triggers a corresponding 2-step RACH uplink transmission procedure, and reports information in the corresponding resource.

Optionally, the reported information may include one or more of the following: (1) user information; (2) cell information; (3) beam failure event information; (4) candidate beam information; and (5) beam measurement result information.

Further, if the selected resource cannot carry corresponding content, partial reporting is selected in a pre-agreed manner. The agreed manner may include reporting in an agreed order until a pre-agreed TB size is reached. For example, a transport block is filled up in the following order: user information>beam failure event information>cell 1 index>cell 2 index>information about a candidate beam with the highest signal quality of cell 1>information about a candidate beam with the highest signal quality of cell 2>information about a candidate beam with second highest signal quality of cell 1>information about a candidate beam with second highest signal quality of cell 2.

An embodiment of this disclosure further provides a terminal. Because a problem-resolving principle of the terminal is similar to that of the method for beam recovery in the embodiments of this disclosure, for implementation of the terminal, reference may be made to the implementation of the method. Details are not described herein again.

Figure 4:
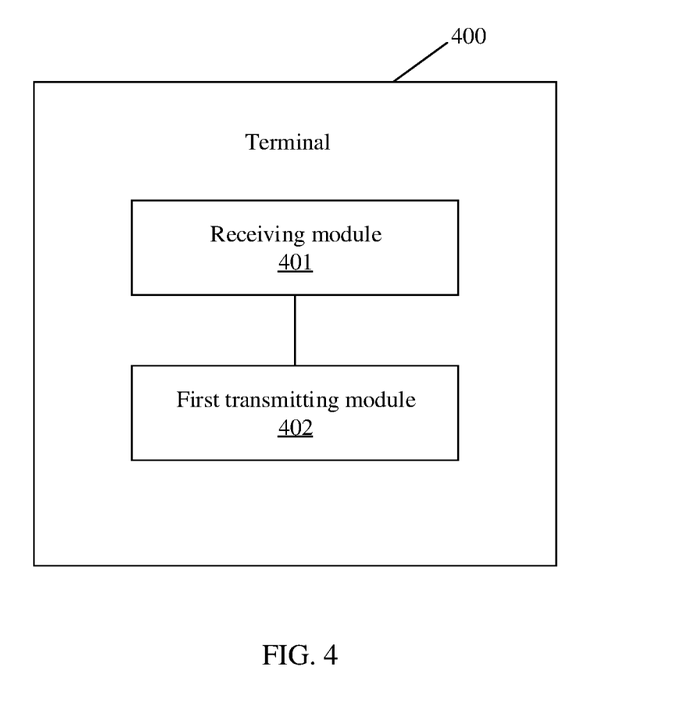
FIG. 4 is a first schematic structural diagram of a terminal according to an embodiment of this disclosure.

Referring to FIG. 4, an embodiment of this disclosure further provides a terminal. The terminal 400 includes:

a receiving module 401, configured to receive resource(s) configured by a network side; and a first transmitting module 402, configured to report information associated with beam recovery by using the resource(s) configured by the network side.

In this embodiment of this disclosure, optionally, the first transmitting module 402 is further configured to select one or more reporting resources from the resource(s) configured by the network side; and report information associated with beam recovery by using the one or more reporting resources.

In this embodiment of this disclosure, optionally, the selecting one or more reporting resources from the resource(s) configured by the network side include one or more of the following:

(1) selecting one or more specified types of resources from the resource(s) configured by the network side;

(2) selecting a specified resource from one or more types of resources configured by the network side; and (3) selecting one or more types of resources from some types of resources configured by the network side.

In this embodiment of this disclosure, optionally, the selecting one or more specified types of resources includes selecting one or more types of resources from multiple types of resources according to a predetermined rule, where the predetermined rule includes any one of the following:

selecting a resource that appears earliest;

selecting a resource that appears after a preset time;

selecting a resource that appears earliest after a preset time; and selecting a second type of resource if a first type of resource is not configured, where the first type and the second type are two different resource types, that is, if a type of resource is not configured, another type of resource is selected.

In this embodiment of this disclosure, optionally, the specified resource includes a resource that appears earliest after a preset time in a specified type of resource.

In this embodiment of this disclosure, optionally, the some types of resources include at least two of the following: dynamic grant resource, configured grant resource, and contention-based 2-step random access channel resource.

In this embodiment of this disclosure, optionally, the first transmitting module 402 is further configured to report the information associated with beam recovery by using a contention-based 2-step random access channel resource, a contention-free 2-step random access channel resource, a 2-step random access channel resource dedicated to beam failure recovery, or a resource dedicated to beam failure recovery.

In this embodiment of this disclosure, optionally, the first transmitting module 402 is further configured to select part or all of the information associated with beam recovery; and report the part or all of the information by using the resource(s) configured by the network side.

In this embodiment of this disclosure, optionally, the selecting part or all of the information associated with beam recovery includes one or more of the following:

selecting part or all of the information associated with beam recovery based on a transport block size;

selecting part or all of the information associated with beam recovery based on a priority of to-be-reported information;

selecting part or all of the information associated with beam recovery based on a cell priority; and selecting part or all of the information associated with beam recovery based on a priority of a beam measurement result.

In this embodiment of this disclosure, optionally, the resource(s) configured by the network side may include one or more of the following.

(1) A contention-based PRACH resource.

(2) A contention-free PRACH resource.

For example, this type of resource may include a contention-free PRACH resource dedicated to beam failure.

(3) A Type1/2 Configured grant PUSCH resource.

(3) A dynamically scheduled PUSCH resource.

(4) A PUSCH resource dedicated to beam failure recovery.

For example, this type of resource may be configured in the following mode: In a beam failure recovery procedure configured for a cell, a PUSCH resource corresponding to the procedure and a cell to which the resource belongs are clearly indicated.

(5) A contention-based 2 step RACH resource.

For example, this type of resource may be configured in a broadcast manner and shared with other users.

(6) A contention-free 2 step RACH resource.

For example, this type of resource may be configured in a broadcast or UE-specific (UE-specific) manner.

For another example, a use purpose of this type of resource may not be limited during configuration.

(7) A 2-step random access channel resource dedicated to beam failure recovery.

For example, this type of resource is configured in the following mode: In a beam failure recovery procedure configured for a cell (cell), PRACH and PUSCH resources corresponding to the procedure and cells to which these resources belong are clearly indicated.

(8) A PUCCH resource.

(9) A PUCCH resource dedicated to beam failure reporting.

For example, this type of resource is configured in the following mode: In a beam failure recovery procedure configured for a cell, a PUCCH resource corresponding to the procedure and a cell to which the resource belongs are clearly indicated.

In this embodiment of this disclosure, optionally, the receiving module 401 is further configured to perform one or more of the following: obtaining a PUSCH resource corresponding to a beam failure recovery procedure and/or a cell to which the PUSCG resource corresponding to the beam failure recovery procedure belongs, where the PUSCH resource and/or the cell is indicated by the network device when the network side is configuring the beam failure recovery procedure; obtaining a contention-based 2-step random access channel resource configured by the network side in a broadcast manner; obtaining a contention-free 2-step random access channel resource configured by the network side in a broadcast or UE-specific manner; obtaining a PRACH resource corresponding to a beam failure recovery procedure and/or a cell to which the PRACH resource corresponding to the beam failure recovery procedure belongs, where the PRACH resource and/or the cell is indicated by the network device when the network side is configuring the beam failure recovery procedure; and obtaining a PUCCH resource corresponding to a beam failure recovery procedure and/or a cell to which the PUCCH resource corresponding to the beam failure recovery procedure belongs, where the PUCCH resource and/or the cell is indicated by the network device when the network side is configuring the beam failure recovery procedure.

In this embodiment of this disclosure, optionally, the information associated with beam recovery may include one or more of the following: (1) user information; (2) cell information; (3) beam failure event information; (4) candidate beam information; and (5) beam measurement result information.

The terminal provided in this embodiment of this disclosure can perform the foregoing method embodiment. An implementation principle and a technical effect thereof are similar to those of the method embodiment. Details are not described again herein in this embodiment.

An embodiment of this disclosure further provides a network device. Because the principle for the network device to resolve the problem is similar to that of the method for beam recovery in the embodiments of this disclosure, for the implementation of the network device, reference may be made to the implementation of the method, and details are not repeated.

Figure 5:
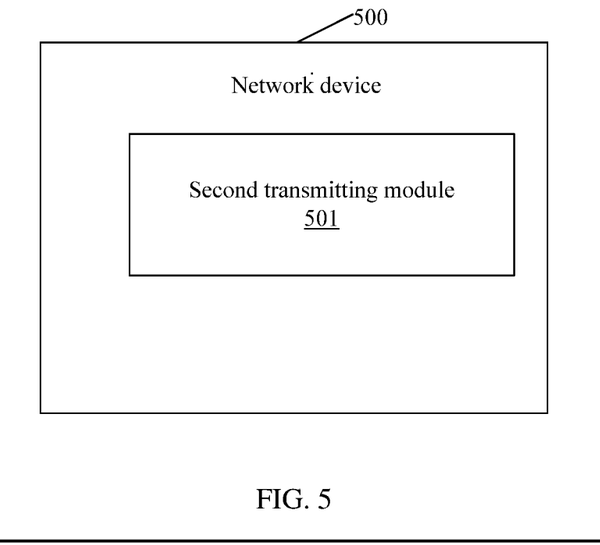
FIG. 5 is a first schematic structural diagram of a network device according to an embodiment of this disclosure.

Referring to FIG. 5, an embodiment of this disclosure further provides a network device, where the network device 500 includes:

a second transmitting module 501, configured to transmit resource(s) configured by a network side to a terminal, where the resource(s) configured by the network side are used for the terminal to report information associated with beam recovery.

In this embodiment of this disclosure, optionally, the resource(s) configured by the network side may include one or more of the following.

(1) A contention-based PRACH resource.

(2) A contention-free PRACH resource.

For example, this type of resource may include a contention-free PRACH resource dedicated to beam failure.

(3) A Type1/2 Configured grant PUSCH resource.

(3) A dynamically scheduled PUSCH resource.

(4) A PUSCH resource dedicated to beam failure recovery.

For example, this type of resource may be configured in the following mode: In a beam failure recovery procedure configured for a cell, a PUSCH resource corresponding to the procedure and a cell to which the resource belongs are clearly indicated.

(5) A contention-based 2 step RACH resource.

For example, this type of resource may be configured in a broadcast manner and shared with other users.

(6) A contention-free 2 step RACH resource.

For example, this type of resource may be configured in a broadcast or UE-specific manner.

For another example, a use purpose of this type of resource may not be limited during configuration.

(7) A 2-step random access channel resource dedicated to beam failure recovery.

For example, this type of resource is configured in the following mode: In a beam failure recovery procedure configured for a cell (cell), PRACH and PUSCH resources corresponding to the procedure and cells to which these resources belong are clearly indicated.

(8) A PUCCH resource.

(9) A PUCCH resource dedicated to beam failure reporting.

For example, this type of resource is configured in the following mode: In a beam failure recovery procedure configured for a cell, a PUCCH resource corresponding to the procedure and a cell to which the resource belongs are clearly indicated.

In this embodiment of this disclosure, optionally, the second transmitting module 501 is further configured to perform one or more of the following:

(1) when configuring a beam failure recovery procedure, indicating, to the terminal, a PUSCH resource corresponding to the beam failure recovery procedure and/or a cell to which the PUSCH by the network side when the network side;

(2) transmitting, to the terminal in a broadcast manner, a contention-based 2-step random access channel resource configured by the network side;

(3) transmitting, to the terminal in a broadcast or UE-specific manner, a contention-free 2-step random access channel resource configured by the network side;

(4) when configuring a beam failure recovery procedure, indicating, to the terminal, a PRACH resource corresponding to the beam failure recovery procedure and/or a cell to which the PRACH by the network side when the network side; and (5) when configuring a beam failure recovery procedure, indicating, to the terminal, a PUCCH resource corresponding to the beam failure recovery procedure and/or a cell to which the PUCCH resource corresponding to the beam failure recovery procedure belongs.

In this embodiment of this disclosure, optionally, the information associated with beam recovery may include one or more of the following: (1) user information; (2) cell information; (3) beam failure event information; (4) candidate beam information; and (5) beam measurement result information.

The network device provided in this embodiment of this disclosure can perform the foregoing method embodiment. An implementation principle and a technical effect thereof are similar to those of the method embodiment. Details are not described again herein in this embodiment.

Figure 6:
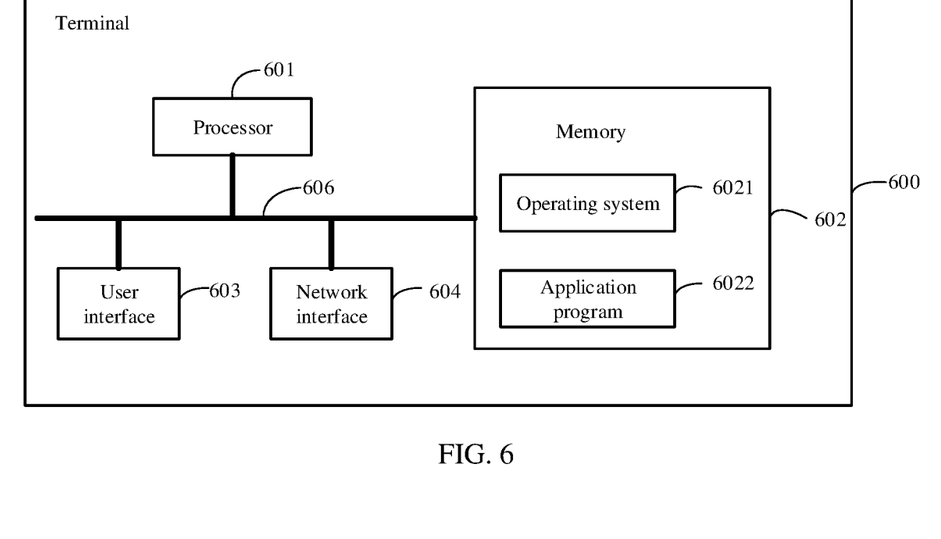
FIG. 6 is a second schematic structural diagram of a terminal according to an embodiment of this disclosure.

As shown in FIG. 6, a terminal 600 in FIG. 6 includes at least one processor 601, a memory 602, at least one network interface 604, and a user interface 603. Components of the terminal 600 are coupled together by using a bus system 605. It can be understood that the bus system 605 is used to implement connection and communication between these components. In addition to a data bus, the bus system 605 further includes a power bus, a control bus, and a status signal bus. However, for clarity of description, various buses are denoted as the bus system 605 in FIG. 6.

The user interface 603 may include a display, a keyboard, or a pointing device (for example, a mouse, a trackball (trackball), a touch panel, or a touchscreen).

It can be understood that the memory 602 in this embodiment of this disclosure may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not restrictive description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data rate SDRAM, DDRSDRAM), an enhanced synchronous dynamic random access memory (Enhanced SDRAM, ESDRAM), a synchronous link dynamic random access memory (Synch link DRAM, SLDRAM), and a direct rambus random access memory (Direct Rambus RAM, DRRAM). The memory 602 of the system and the method described in the embodiments of this disclosure is intended to include but not limited to these and any other applicable types of memories.

In some embodiments, the memory 602 stores the following elements: executable modules or data structures, or a subset thereof, or an extended set thereof: an operating system 6021 and an application program 6022.

The operating system 6021 includes various system programs, such as a framework layer, a core library layer, and a driver layer, for implementing various basic services and processing hardware-based tasks. The application program 6022 includes various application programs, such as a media player (Media Player) and a browser (Browser), which are used to implement various application services. A program for implementing the method in the embodiments of this disclosure may be included in the application program 6022.

In an embodiment of this disclosure, when a program or an instruction stored in the memory 602, which may be specifically a program or an instruction stored in the application program 6022, is invoked and implemented, the following steps are implemented: receiving resource(s) configured by a network side; and reporting information associated with beam recovery by using the resource(s) configured by the network side.

The terminal provided in this embodiment of this disclosure can perform the foregoing method embodiment. An implementation principle and a technical effect thereof are similar to those of the method embodiment. Details are not described again herein in this embodiment.

Figure 7:
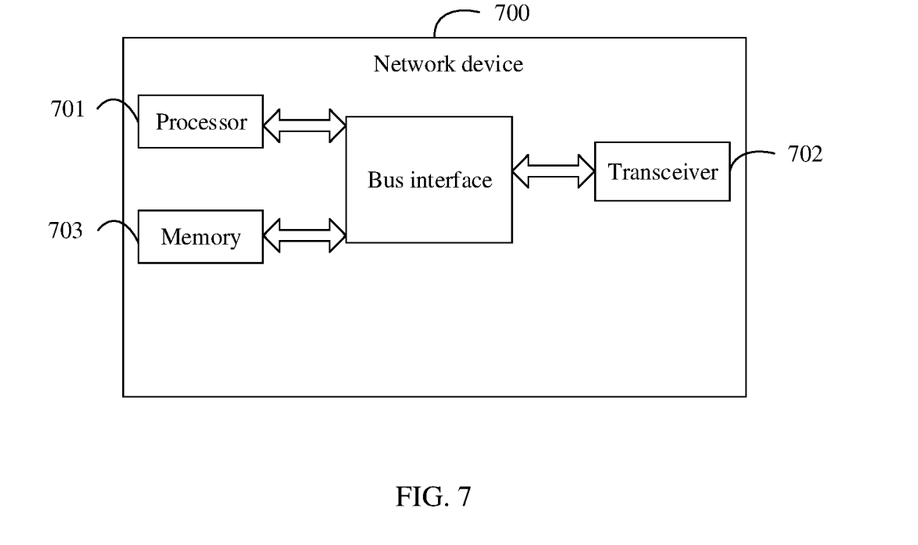
FIG. 7 is a second schematic structural diagram of a network device according to an embodiment of this disclosure.

Referring to FIG. 7, FIG. 7 is a structural diagram of a network device to which an embodiment of this disclosure is applied. As shown in FIG. 7, the network device 700 includes a processor 701, a transceiver 702, a memory 703, and a bus interface. The processor 701 may be responsible for bus architecture management and general processing. The memory 703 may store data that the processor 701 uses when performing an operation.

In an embodiment of this disclosure, the network device 700 further includes a computer program stored in the memory 703 and capable of running on the processor 701, where when the computer program is executed by the processor 701, the following step is implemented: transmitting resource(s) configured by a network side to a terminal, where the resource(s) configured by the network side are used for the terminal to report information associated with beam recovery.

In FIG. 7, a bus architecture may include any number of interconnected buses and bridges, and specifically connect together various circuits of one or more processors represented by the processor 701 and a memory represented by the memory 703. The bus architecture may further interconnect various other circuits such as a peripheral device, a voltage regulator, and a power management circuit. These are all common sense in the art, and therefore are not further described in this specification. The bus interface provides interfaces. The transceiver 702 may be a plurality of components, including a transmitter and a receiver, and provides units for communicating with a variety of other apparatuses on a transmission medium.

The network device provided in this embodiment of this disclosure can perform the foregoing method embodiment. An implementation principle and a technical effect thereof are similar to those of the method embodiment. Details are not described again herein in this embodiment.

Method or algorithm steps described in combination with the content disclosed in this disclosure may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a removable hard disk, a CD-ROM, or a storage medium of any other form known in the art. For example, a storage medium is coupled to the processor, so that the processor can read information from the storage medium and write information into the storage medium. Certainly, the storage medium may be a component of the processor. The processor and the storage medium may be included in an ASIC. In addition, the ASIC may be included in a core network interface device. Certainly, the processor and the storage medium may alternatively exist in the core network interface device as discrete components.

Persons skilled in the art should be aware that in the foregoing one or more examples, functions described in this disclosure may be implemented by hardware, software, firmware, or any combination thereof. In the case of implementation by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another place. The storage medium may be any available medium accessible by a general-purpose or dedicated computer.

Persons of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. Persons skilled in the art may use a different method to implement the described functions for each particular application, but it should not be considered that the implementation goes beyond the scope of this disclosure.

It can be clearly understood by persons skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may or may not be physical units, and may be located in one position, or may be distributed on a plurality of network elements. Some or all of the units may be selected based on an actual need to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as a separate product, the functions may be stored in a computer-readable storage medium. Based on such an understanding, the technical solutions of this disclosure essentially or the part contributing to the related art may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

Persons of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

It can be understood that the embodiments described in the embodiments of this disclosure may be implemented by hardware, software, firmware, middleware, microcode, or a combination thereof. For hardware implementation, the module, unit, and subunit may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented in or outside the processor.

The objectives, technical solutions, and beneficial effects of this disclosure are further described in detail in the foregoing specific embodiments. It should be understood that the foregoing descriptions are merely specific embodiments of this disclosure, and are not intended to limit the protection scope of this disclosure. Any modification, equivalent replacement, improvement, or the like made based on the technical solutions in this disclosure shall fall within the protection scope of this disclosure.

Persons skilled in the art should understand that the embodiments of this disclosure may be provided as a method, a system, or a computer program product. Therefore, the embodiments of this disclosure may use a form of hardware only embodiments, software only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to the embodiments of this disclosure without departing from the spirit and scope of this disclosure. Therefore, this disclosure is intended to cover the changes and variations provided that the changes and variations of the embodiments of this disclosure fall within the scope of the claims of this disclosure or equivalent technologies thereof.

What is claimed is:

1. A method for beam recovery, applied to a terminal and comprising:
    receiving resource(s) configured by a network side; and
    reporting information associated with beam recovery by using the resource(s) configured by the network side;
    wherein the resource(s) configured by the network side comprise one or more of the following:
    a contention-based physical random access channel (PRACH) resource;
    a contention-free PRACH resource;
    a type-1 or type-2 configured grant physical uplink shared channel (PUSCH) resource;
    a dynamically scheduled PUSCH resource;
    a PUSCH resource dedicated to beam failure recovery;
    a contention-based 2-step random access channel resource;
    a contention-free 2-step random access channel resource;
    a 2-step random access channel resource dedicated to beam failure recovery;
    a physical uplink control channel (PUCCH) resource; or
    a PUCCH resource dedicated to beam failure reporting;
    wherein the receiving resource(s) configured by a network side comprises one or more of the following:
    obtaining a PUSCH resource corresponding to a beam failure recovery procedure and/or a cell to which the PUSCH resource corresponding to the beam failure recovery procedure belongs, wherein the PUSCH resource and/or the cell is indicated by the network side when the network side is configuring the beam failure recovery procedure;
    obtaining a contention-based 2-step random access channel resource configured by the network side in a broadcast manner;
    obtaining a contention-free 2-step random access channel resource configured by the network side in a broadcast or UE-specific manner;
    obtaining a PRACH resource corresponding to a beam failure recovery procedure and/or a cell to which the PRACH resource corresponding to the beam failure recovery procedure belongs, wherein the PRACH resource and/or the cell is indicated by the network side when the network side is configuring the beam failure recovery procedure; or
    obtaining a PUCCH resource corresponding to a beam failure recovery procedure and/or a cell to which the PUCCH resource corresponding to the beam failure recovery procedure belongs, wherein the PUCCH resource and/or the cell is indicated by the network side when the network side is configuring the beam failure recovery procedure.

2. The method according to claim 1, wherein the reporting information associated with beam recovery by using the resource(s) configured by the network side comprise:
    selecting one or more reporting resources from the resource(s) configured by the network side; and
    reporting the information associated with beam recovery by using the one or more reporting resources.

3. The method according to claim 2, wherein the selecting one or more reporting resources from the resource(s) configured by the network side comprise one or more of the following:
    selecting one or more specified types of resources from the resource(s) configured by the network side;
    selecting a specified resource from one or more types of resources configured by the network side; or
    selecting one or more types of resources from some types of resources configured by the network side;
    wherein the some types of resources comprise at least two of the following: dynamic grant resource, configured grant resource, and contention-based 2-step random access channel resource.

4. The method according to claim 3, wherein
    the selecting one or more specified types of resources comprises selecting one or more types of resources from multiple types of resources according to a predetermined rule, wherein the predetermined rule comprises any one of the following:
    selecting a resource that appears earliest;
    selecting a resource that appears after a preset time;
    selecting a resource that appears earliest after a preset time; or
    selecting a second type of resource if a first type of resource is not configured, wherein the first type and the second type are two different resource types.

5. The method according to claim 3, wherein the specified resource comprises a resource that appears earliest after a preset time among one or more types of resources configured by the network side.

6. The method according to claim 1, wherein the information associated with beam recovery comprises one or more of the following:
    user information;
    cell information;
    beam failure event information;
    candidate beam information; or
    beam measurement result information.

7. The method according to claim 1, wherein the reporting information associated with beam recovery by using the resource(s) configured by the network side comprise:

selecting part or all of the information associated with beam recovery; and reporting the part or all of the information by using the resource(s) configured by the network side.

8. The method according to claim 7, wherein the selecting part or all of the information associated with beam recovery comprises one or more of the following:

selecting part or all of the information associated with beam recovery based on a transport block size;

selecting part or all of the information associated with beam recovery based on a priority of to-be-reported information;

selecting part or all of the information associated with beam recovery based on a cell priority; and selecting part or all of the information associated with beam recovery based on a priority of a beam measurement result.

9. A method for beam recovery, applied to a network device and comprising: transmitting resource(s) configured by a network side to a terminal, wherein the resource(s) configured by the network side are used for the terminal to report information associated with beam recovery; wherein the resource(s) configured by the network side comprise one or more of the following: a contention-based physical random access channel (PRACH) resource; a contention-free PRACH resource; a type-1 or type-2 configured grant physical uplink shared channel (PUSCH) resource; a dynamically scheduled PUSCH resource; a PUSCH resource dedicated to beam failure recovery; a contention-based 2-step random access channel resource; a contention-free 2-step random access channel resource; a 2-step random access channel resource dedicated to beam failure recovery; a physical uplink control channel (PUCCH) resource; or a PUCCH resource dedicated to beam failure reporting; wherein the transmitting resource(s) configured by a network side to a terminal comprises one or more of the following: when configuring a beam failure recovery procedure, indicating, to the terminal, a physical uplink shared channel (PUSCH) resource corresponding to the beam failure recovery procedure and/or a cell to which the PUSCH by the network side when the network side; transmitting a contention-based 2-step random access channel resource to the terminal in a broadcast manner; transmitting a contention-free 2-step random access channel resource to the terminal in a broadcast or UE-specific manner; when configuring a beam failure recovery procedure, indicating, to the terminal, a physical random access channel (PRACH) resource corresponding to the beam failure recovery procedure and/or a cell to which the PRACH by the network side when the network side; or when configuring a beam failure recovery procedure, indicating, to the terminal, a physical uplink control channel (PUCCH) resource corresponding to the beam failure recovery procedure and/or a cell to which the PUCCH resource corresponding to the beam failure recovery procedure belongs.

10. The method according to claim 9, wherein the information associated with beam recovery comprises one or more of the following:

user information;
cell information;
beam failure event information;
candidate beam information; or
beam measurement result information.

11. A communications device, comprising a processor, a memory, and a program stored in the memory and capable of running on the processor, wherein the program is executed by the processor to implement: receiving resource(s) configured by a network side; and reporting information associated with beam recovery by using the resource(s) configured by the network side; wherein the resource(s) configured by the network side comprise one or more of the following: a contention-based physical random access channel (PRACH) resource; a contention-free PRACH resource; a type-1 or type-2 configured grant physical uplink shared channel (PUSCH) resource; a dynamically scheduled PUSCH resource; a PUSCH resource dedicated to beam failure recovery; a contention-based 2-step random access channel resource; a contention-free 2-step random access channel resource; a 2-step random access channel resource dedicated to beam failure recovery; a physical uplink control channel (PUCCH) resource; or a PUCCH resource dedicated to beam failure reporting; wherein the receiving resource(s) configured by a network side comprises one or more of the following: obtaining a PUSCH resource corresponding to a beam failure recovery procedure and/or a cell to which the PUSCH resource corresponding to the beam failure recovery procedure belongs, wherein the PUSCH resource and/or the cell is indicated by the network side when the network side is configuring the beam failure recovery procedure; obtaining a contention-based 2-step random access channel resource configured by the network side in a broadcast manner; obtaining a contention-free 2-step random access channel resource configured by the network side in a broadcast or UE-specific manner; obtaining a PRACH resource corresponding to a beam failure recovery procedure and/or a cell to which the PRACH resource corresponding to the beam failure recovery procedure belongs, wherein the PRACH resource and/or the cell is indicated by the network side when the network side is configuring the beam failure recovery procedure; or obtaining a PUCCH resource corresponding to a beam failure recovery procedure and/or a cell to which the PUCCH resource corresponding to the beam failure recovery procedure belongs, wherein the PUCCH resource and/or the cell is indicated by the network side when the network side is configuring the beam failure recovery procedure; or, the program is executed by the processor to implement: transmitting resource(s) configured by a network side to a terminal, wherein the resource(s) configured by the network side are used for the terminal to report information associated with beam recovery; wherein the resource(s) configured by the network side comprise one or more of the following: a contention-based physical random access channel (PRACH) resource; a contention-free PRACH resource; a type-1 or type-2 configured grant physical uplink shared channel (PUSCH) resource; a dynamically scheduled PUSCH resource; a PUSCH resource dedicated to beam failure recovery; a contention-based 2-step random access channel resource; a contention-free 2-step random access channel resource; a 2-step random access channel resource dedicated to beam failure recovery; a physical uplink control channel (PUCCH) resource; or a PUCCH resource dedicated to beam failure reporting; wherein the transmitting resource(s) configured by a network side to a terminal comprises one or more of the following: when configuring a beam failure recovery procedure, indicating, to the terminal, a physical uplink shared channel (PUSCH) resource corresponding to the beam failure recovery procedure and/or a cell to which the PUSCH by the network side when the network side; transmitting a contention-based 2-step random access channel resource to the terminal in a broadcast manner; transmitting a contention-free 2-step random access channel resource to the terminal in a broadcast or UE-specific manner; when configuring a beam failure recovery procedure, indicating, to the terminal, a physical random access channel (PRACH) resource corresponding to the beam failure recovery procedure and/or a cell to which the PRACH by the network side when the network side; or when configuring a beam failure recovery procedure, indicating, to the terminal, a physical uplink control channel (PUCCH) resource corresponding to the beam failure recovery procedure and/or a cell to which the PUCCH resource corresponding to the beam failure recovery procedure belongs.

12. The communications device according to claim 11, wherein the communication device is a terminal, the program is executed by the processor to implement:

selecting one or more reporting resources from the resource(s) configured by the network side; and reporting the information associated with beam recovery by using the one or more reporting resources.

13. The communications device according to claim 12, wherein the communication device is the terminal, the program is executed by the processor to implement:

selecting one or more specified types of resources from the resource(s) configured by the network side;

selecting a specified resource from one or more types of resources configured by the network side; and selecting one or more types of resources from some types of resources configured by the network side;

wherein the some types of resources comprise at least two of the following: dynamic grant resource, configured grant resource, and contention-based 2-step random access channel resource.

14. The communications device according to claim 11, wherein the communication device is the terminal, the reporting information associated with beam recovery by using the resource(s) configured by the network side comprise:

selecting part or all of the information associated with beam recovery; and reporting the part or all of the information by using the resource(s) configured by the network side.

15. The communications device according to claim 14, wherein the selecting part or all of the information associated with beam recovery comprises one or more of the following:

selecting part or all of the information associated with beam recovery based on a transport block size;

selecting part or all of the information associated with beam recovery based on a priority of to-be-reported information;

selecting part or all of the information associated with beam recovery based on a cell priority; and selecting part or all of the information associated with beam recovery based on a priority of a beam measurement result.

* * * * *